United States Patent Office 3,351,597
Patented Nov. 7, 1967

3,351,597
PROCESS FOR ACYLATING 7-AMINO
CEPHALOSPORANIC ACID
Harvey M. Higgins, Jr., Danville, Ind., assignor to Eli
Lilly and Company, Indianapolis, Ind., a corporation
of Indiana
No Drawing. Filed Nov. 23, 1966, Ser. No. 596,416
6 Claims. (Cl. 260—243)

This invention relates to cephalosporin antibiotics and to improved methods for manufacturing such chemical substances. More particularly, this invention provides an improved process for acylating 7-aminocephalosporanic acid under practical conditions of chemical manufacture to obtain more economically the desired cephalosporin antibiotic chemicals.

In the manufacture of various cephalosporin antibiotics, Cephalosporin C is produced by fermentation processes and the Cephalosporin C is cleaved at the amido bond to obtain 7-aminocephalosporanic acid, (7-ACA), the so-called cephalosporin nucleus. In the manufacture of various desired antibiotics the 7-ACA is caused to react with various acyl halide, acid anhydride, or free acid forms of chemical compounds to form cephalosporin chemical compounds which have been found to be effective broad-spectrum antibiotics against gram-positive and gram-negative microorganisms. Examples of such compounds include cephalothin, prepared by condensing a 2-thienylacetyl halide (sometimes termed thiophene-2-acetyl halide) with 7-ACA. Efforts are constantly being directed toward increasing the commercial efficiency in manufacturing such desirable products.

It is an object of this invention to provide an improved process for preparing cephalosporin antibiotics by a generally anhydrous acylation procedure wherein 7-ACA, the cephalosporin nucleus, is caused to react with a selected acyl derivative of a selected acid in the presence of urea or a urea-type amide retaining at least one unsubstituted amide grouping.

It is a further object of this invention to provide a practical 7-ACA acylation procedure which permits the obtaining of high yields of cephalosporin antibiotics while using impure 7-ACA contaminated with a methanol-insoluble, acidic polymer, characterized as chiefly polysaccharide in nature. The polysaccharide is apparently produced during the fermentation of Cephalosporin C and is carried through several purification steps with Cephalosporin C.

It is a specific object of this invention to provide an improved procedure for preparing sodium 7-(2'-thienyl-acetamido)cephalosporin [sodium cephalothin] in a non-aqueous acylation procedure which involves the concomitant use in the reaction mixture of urea or a similar substance such as thiourea, biuret, dithiobiuret, phenylurea, or 1,1-diphenylurea. The latter two compounds represent mono and diarylureas generally useful in carrying out the acylation of the cephalosporin nucleus by the method of this invention.

Other objects, aspects, and advantages of this invention will become apparent from reading the description and claims which follow.

Briefly, according to this invention, cephalosporin antibiotics such as cephalothin can be prepared in improved yield by acylating 7-ACA with an acyl halide such as 2-thienylacetyl chloride in the presence of (1) a substantially anhydrous organic liquid diluent and (2) a neutral urea amide compound of molecular weight of from about 60 to 500 such as urea, thiourea, biuret, dithiobiuret, phenylurea, phenylthiourea, and 1,1-diphenylurea, at mild temperatures until the desired cephalosporin product is formed, and then recovering the cephalosporin from the resulting reaction mixture. For best results the urea compound or mixture of urea compounds should be present in amounts ranging from about 0.5 to about 2 molar equivalents thereof per molar equivalent of the acylating agent.

The acylating agent, i.e., the acyl halide, should be present in the reaction mixture in molar equivalent amounts at least equal to the 7-ACA reactant which is ordinarily the more expensive of the two reactants. An excess of acyl halide, e.g., from 20 percent to 100 percent molar excess of the acyl halide, is preferably used to insure substantially complete reaction of the 7-ACA. 2-thienylacetyl chloride is the preferred acylating agent to use in this reaction to prepare 7-(2'-thienylaceamido)-cephalosporanic acid [cephalothin], although 2-thienylacetyl bromide may also be used.

The organic liquid diluent which is used in the reaction medium should be a non-solvent for the 7-ACA, should be substantially chemically inert toward the acyl halide, but should be a solvent for the cephalosporin acylation product. This diluent may be a single compound such as an appropriate dialkyl ketone having from 1 to 2 carbon atoms in each alkyl group, e.g., acetone, methyl ethyl ketone, diethyl ketone, an alkyl aliphatic acylate ester having from 2 to about 7 carbon atoms such as ethyl acetate, methyl formate, propyl acetate, propylene glycol diacetate, methyl propionate, etc., a dialkyl sulfoxide having from 1 to about 4 carbon atoms in each alkyl group such as dimethyl sulfoxide, or mixtures of organic liquids such as equal parts by volume of ethyl acetate and acetones. The preferred organic liquid diluent for the purpose of the process of this invention is acetone or a mixture containing a major proportion of acetone. The organic liquid diluent system, whether it is a single compound or a mixture of compounds, should be substantially anhydrous, although with some impure 7-ACA starting materials, it has been found that a small amount of water, usually under 5 percent by volume of the total solvent system, aids in removing water-soluble or water-dispersible coloring impurities. However, the acylation reaction of this invention can be run in the complete absence of water to obtain acceptable cephalosporin products.

The urea compound constitutes an important component in the reaction medium for conducting the acylation reaction in the manner of this invention. Of the various available urea compounds, urea itself is preferred, alone or mixed with biuret. The urea compounds are not initially soluble in the organic liquid diluent system but the urea compounds can be kept in suspension by suitable agitation such as by stirring the mixture during the course of the reaction. The amount of the urea compound used in the reaction mixture to accomplish smooth acylation of at least some 7-ACA is not critical. However, since it is usually desired to obtain as high a yield as is possible in the given acylation run, I have found that best practice dictates that about 0.5 to 2.0 molar equivalents of the urea compound be used for each mole of acyl halide. When urea is the selected compound, it is preferred to use about 0.8 to about 1.2 molar equivalents of urea for each mole of the acyl halide. Lower molar equivalent ratios of urea compounds may be used, but the yield of product suffers. Higher molar ratios than those stated may be used but are not needed.

In conducting the acylation reaction in the manner of this invention, it is believed that the best practice is to mix the organic liquid diluent, the urea compound, the 7-ACA, and a little water if the 7-ACA is impure, stir the mixture, and add the acyl halide to the stirred mixture at a steady even rate, sufficient to avoid substantial chemical decomposition of reactants or cephalosporin product, say, about 0.3 to about 2 hours, at a mild temperature between about −5° C. to about 50° C., to form the cephalosporin product. It is preferred to add the acyl halide to the 7-ACA reaction mixture over a period of about 0.5 to 1.5 hours at 15 to 35° C. When the acyl halide addition is completed, the reaction mixture is preferably stirred for a time sufficient to insure as complete a reaction as is possible. Depending upon the size of the batch, the stirring rate, the temperature, molar ratio, etc., stirring may be continued for 1 to 2 hours after the acyl chloride addition has been completed.

The acylation reaction mixture obtained as described above, according to this invention, is filtered to remove impurities, particularly the polysaccharide-like material, if present with the 7-ACA reactant. The organic liquid solution of the cephalosporin product constituting the filtrate and containing little water, if any, is concentrated preferably under vacuum to remove most of the organic liquid solvent system, thereby leaving the desired cephalosporin acid in a concentrated form, say, of 20 to 25 percent by weight. The concentrated cephalosporin product solution is then contacted with an appropriate organic liquid such as ethyl acetate or other appropriate organic liquid medium to separate any oily, water-miscible compounds originally solubilized in the initial reaction medium. The hydrophilic phase is separated and discarded after being washed with ethyl acetate or other suitable solvent to recover any adhering cephalosporin. The organic liquid solution of the cephalosporin acid, purified in the manner described above, can then be washed with water to separate water-soluble material. The water phase on standing separates from the organic liquid solution of the cephalosporin acid product. After separating the aqueous phase, the remaining organic solvent solution of the desired cephalosporin product (e.g., an acetone-ethyl acetate solution of cephalothin acid obtained by reacting 7-ACA and 2-thienylacetyl chloride in acetone and washed with ethyl acetate) can be treated with an appropriate organic alkali metal salt in an organic solvent to form a cephalosporin salt which precipitates from the organic solvent. For example, an acetone-ethyl acetate solution of cephalothin [7-(2-thienylacetamido)cephalosporanic acid] can be treated with sodium acetate in methanol to precipitate sodium cephalothin [sodium 7-(2'-thienylacetamido)cephalosporanate].

The advantages of the process improvements of this invention has been described herein as being applied primarily to the production of cephalothin from impure 7-ACA and 2-thienylacetyl chloride because of the interest in cephalothin as a highly useful, well-recognized therapeutic agent in the field of antibiotic treatment. However, the invention should not be restricted thereto since this process can be used to prepare other active cephalosporin antibiotics which are prepared by acylating the cephalosporin nucleus, 7-ACA, with various desired acylating agents. The following examples of cephalosporin products and the acyl halides used in preparing them by acylating 7-ACA, together with the detailed examples which follow, will illustrate the types of compounds which can be made by the process of the present invention:

7-(2-phenoxyacetamido)cephalosporanic acid from 2-phenoxyacetyl chloride 7-(phenylmercaptoacetamido)cephalosporanic acid from 2-phenylmercaptoacetyl chloride 7-(5'-oxazolylacetamido)cephalosporanic acid from 5-oxazolylacetyl chloride 7-(4'[5]-imidazolylacetamido)cephalosporanic acid from 4(5)-imidazolylacetyl chloride 7-(2'-pyranylacetamido)cephalosporanic acid from 2-pyranylacetyl chloride 7-(n-butylmercaptoacetamido)cephalosporanic acid from n-butylmercaptoacetyl chloride 7-(2'-morpholinylacetamido)cephalosporanic acid from 2-morpholinylacetyl chloride 7-(2'-pyrazinylacetamido)cephalosporanic acid from 2-pyrazinylacetyl chloride 7-(5'-imidazolinylacetamido)cephalosporanic acid from 5-imidazolinylacetyl chloride 7-(3'-bromo-2'-pyridylacetamido)cephalosporanic acid from 3-bromo-2-pyridylacetyl chloride 7-[β-(5'-fluoro-2'-pyridyl)propionamido]cephalosporanic acid from β-(5-fluoro-2-pyridyl)propionyl chloride 7-[β(5'-pyrimidyl)propionamido]cephalosporanic acid from β-(5-pyrimidyl)propionyl chloride 7-(5'-nitro-2'-thienylacetamido)cephalosporanic acid from 5-nitro-2-thienylacetyl chloride 7-(2'-thiazolylacetamido)cephalosporanic acid from 2-thiazolylacetyl chloride 7-[γ-(2'-furyl)butyramido]cephalosporanic acid from γ-(2-furyl)butyryl chloride 7-[ω-(2'-thienyl)valeramido]cephalosporanic acid from ω-(2-thienyl)valeryl chloride 7-[ε-(3-thienyl)hexanoyl]amidocephalosporanic acid from ε-(3-thienyl)hexanoyl chloride 7-(2'-methyl-3-pyridyl-acetamido)cephalosporanic acid from 2'-methyl-3'-pyridyl-acetyl chloride 7-[α-(2'-thienyl)propionamido]cephalosporanic acid from α-2-thienylpropionyl chloride 7-[α-(2'-thienyl)isobutyramido]cephalosporanic acid from α-2-thienylisobutyryl chloride 7-[α-(2'-furyl)-n-butyramido]cephalosporanic acid from α-2-furyl-n-butyryl chloride 7-(2'-methyl-3'-furylacetamido)cephalosporanic acid from (2-methyl-3-furyl)acetyl chloride 7-(3'-methyl-2'-thienylacetamido)cephalosporanic acid from (3-methyl-2-thienyl)acetyl chloride 7-(5'-methoxy-3'-pyridylacetamido)cephalosporanic acid from (5-methoxy-3-pyridyl)acetyl chloride 7-(2'-triazinylacetamido)cephalosporanic acid from 2'-triazinylacetyl chloride 7-(phenylacetamido)cephalosporanic acid from phenylacetyl chloride 7-[(4'-chlorophenyl)acetamido]cephalosporanic acid from (4'-chlorophenyl)acetyl chloride 7-(octanamido)cephalosporanic acid from octanyl chloride.

*Example 1*

To 750 ml. of acetone were added 11.1 g. of urea and 55 g. of commercially made 7-aminocephalosporanic acid (84.8 percent pure by an ultraviolet assay procedure). To the resulting slurry at room temperature there was added a mixture of 31.3 ml. of 2-thienylacetyl chloride in 375 ml. of acetone at a steady rate over a 1-hour period. When the addition was completed, the mixture was stirred for 2 additional hours to insure complete reaction. The resulting reaction mixture was filtered to obtain 6 g. of an insoluble precipitate. This precipitate assaying not more than 6.2 percent 7-ACA by an ultraviolet light (UV) absorption method, was analyzed by the anthrone test procedure and found to contain 87.3 percent carbohydrate. The organic filtrate phase analyzed as containing 62 g. of 7-(2'-thienylacetamido)cephalosporanic acid. This organic phase was concentrated to 250 ml., which was shown by analysis to contain about 25 percent of the 7-(2'-thienylacetamido)cephalosporanic acid. When 1.5 liters of ethyl acetate were added and mixed with the concentrate, about 10 ml. of a viscous lower phase was obtained. This was separated from the organic upper phase. The oily lower phase may be discarded, but in this work the phase was scrubbed with 80 ml. of ethyl acetate. This ethyl acetate wash phase which resulted was pooled with 100 ml. of ethyl acetate and the resulting 180 ml. of ethyl acetate solution were used as the second scrub on the primary 1100 ml. aqueous phase obtained when the acetone-ethyl acetate-acid solution after removal of the oily residue as above described, was now in turn scrubbed with 1 liter of water. The aqueous 1100 ml. phase was washed again with the 180 ml. ethyl acetate wash solution from the oily gum wash step. The aqueous phase was separated and discarded. The organic phase from the aqueous wash step (170 ml.) was pooled with the scrubbed acetone-ethyl acetate-acid organic phase (1630 ml.) to give a water-scrubbed organic solution (1800 ml.) of cephalothin acid.

To this organic solution there was added 119 ml. of a mehanolic solution of sodium acetate (120 mg. of NaOHAc/ml.) with stirring. A precipitate of sodium 7 - (2' - thienylacetamido)cephalosporanate salt (sodium cephalothin) was obtained which weighed 60.7 g. and which analyzed as 95.2 percent pure by the ultraviolet absorption method. The maximum or theoretical yield was 71.5 g. of pure sodium salt. The yield was 80.7 percent of theory. The product exhibited the characteristic ratio of 1.625 at the wave lengths of 237 and 265 millimicrons. This compares closely to the observed ratio of 1.62 to 1.64 at these same wave lengths for highly purified sodium cephalothin.

Example 2

This example illustrates the advantage of using urea in the 7-ACA acylation reaction mixture.

Two acylation runs were made in which all of the conditions were kept constant except for the presence of urea in one of the two reactions. In this experiment in each run 2.2 g. (0.00685 mole) of the same impure 7-ACA as was used in Example 1 were added to 30 ml. of acetone, and then 1.65 g. (0.01029 mole) of 2-thienylacetyl chloride in 15 ml. of acetone was added dropwise over 1 hour at room temperature. In one of the two reactions 0.615 g. (0.0102 mole) of urea was also added before addition of the 2-thienylacetyl chloride began, while no urea was added to the other reaction vessel. The reaction mixtures were stirred for 2 additional hours to insure complete reaction. The organic phase of the reaction mixture from each reaction vessel was concentrated to contain about 25 percent by weight of the 7-(2'-thienylacetamido)cephalosporanic acid, diluted with ethyl acetate to separate an oily residue, separated from the oily residue, washed with water, and then treated with sodium acetate in methanol solution (120 mg. of NaOAc/ml. of solution) with stirring. The sodium 7-(2'-thienylacetamido)cephalosporanate salt (sodium cephalothin) product from each run was analyzed spectrophotometrically in the ultraviolet region. The actual yield of sodium cephalothin from each run calculated from the ultraviolet assay, assuming 95 percent minimum purity. The results are summarized in the following table:

| Variable | Product Analysis [1] | |
| --- | --- | --- |
| | 237/265 Ratio [2] | Wt. (g.) |
| Urea Absent | 1.66 | 1.77 |
| Urea Present | 1.65 | 2.44 |

[1] The U/V absorption was read on a Cary, Model 11, Recording Spectrophotometer.
[2] The 237/265 ratio reflects the purity of the sodium cephalothin product relative to other species also absorbing in the ultraviolet region. In general, the nearer this ratio approaches 1.62 to 1.64, the value for highly purified sodium cephalothin, the better the quality of the once crystallized sodium salt.

In this experiment there was obtained a 38.1 percent improvement in yield when urea was added. This example clearly illustrates that advantage is obtained by using urea in the reaction mixture.

Example 3

This example illustrates that an advantage can also be obtained by incorporating thiourea into the acylation reaction mixture.

To a mixture of 30 ml. of acetone and 1.96 g. (0.028 mole) of thiourea there were added 2.2 g. representing 0.00685 mole of the same impure 7-ACA as was used in Example 1; and then while the mixture was being stirred, 1.65 g. (0.01029 mole) of 2-thienylacetyl chloride in 15 ml. of acetone were added over 1 hour at room temperature. The mixture was stirred for 2 additional hours to insure complete reaction, and was then worked up in the manner described in Example 2 to recover the sodium cephalothin content thereof. The yield of sodium cephalothin was 2.0 g. Based upon the same calculations for the 7-ACA starting material used with no additives, the improvement in yield when thiourea was present was 17.5 percent.

Example 4

To a mixture of 30 ml. of acetone and 2.2 g. (0.00685 mole) of commercial grade 7-ACA (84.8 percent pure) there was added at room temperature 3.5 g. (0.0257 mole) of phenylurea. While stirring the mixture there was added dropwise 1.25 ml. (0.01029 mole) of thiophene-2-acetyl chloride in 15 ml. of acetone over 1 hour. Stirring was continued for an additional hour to insure complete reaction. The insoluble material was filtered and washed with 25 ml. of acetone. The composite filtrate and washings had a volume of 63 ml. An aliquot of the composite was checked by ultraviolet analysis assay after concentration to about 25 percent solids by removing acetone. The remainder of the filtrate was concentrated to 12 ml. volume, diluted with 50 ml. of ethyl acetate to force out a lower water soluble viscous phase. The water soluble lower phase was separated and discarded. The organic upper phase containing the cephalothin product was washed successively with 25 ml. and 10 ml. portions of water. These water washes (37 ml.) were pooled and commingled with 10 ml. of ethyl acetate. The resulting ethyl acetate phase was separated from the water phase and combined with the main organic phase to give 79 ml., assaying 36 mg. of cephalothin/ml. of solution by the ultraviolet assay method. Cephalothin was recovered from the organic phase as an insoluble sodium cephalothin salt by the addition of 3.5 ml. of a 12 percent of sodium acetate in methanol solution, with agitation being continued about 0.5 hour after addition was completed. The resulting sodium cephalothin crystals which precipitated were filtered, washed with 25 ml. of isopropanol, and dried at 40° C. for 18 hours at 10 mm. vacuum pressure. The sodium cephalothin product weighed 1.5 g. The ultraviolet purity was 97.5 percent. The yield was thus 51 percent. In this example, the mother liquor still contained cephalothin activity, reflecting incomplete precipitation.

Example 5

The procedure of Example 4 was followed except that a mixture of 0.00695 mole of the same purity 7-ACA in 30 ml. of acetone with 5.45 g. of 1,1-diphenylurea was treated with 0.01029 mole of thiophene-2-acetyl chloride diluted with 15 ml. of acetone, added dropwise, over 1 hour at room temperature. Sodium cephalothin crystals were precipitated from the purified mixture by commingling sodium acetate in methanol solution with the mixture. The yield was 1.7 g. of 75.5 percent pure sodium cephalothin.

Example 6

To a mixture of the 84.8 percent pure 7-ACA (0.00695 mole) (of the type described in Example 1) in 30 ml. of acetone and 3.47 g. of dithiobiuret, a solution of 0.01029 mole of thiophene-2-acetyl chloride in 15 ml. of acetone was added dropwise over 1 hour at room temperature. The reaction mixture was purified in the manner described in Example 3. The cephalothin product content was precipitated from the organic solution by adding sodium acetate in methanol to effect crystallization of sodium cephalothin. The yield of sodium cephalothin was 1.8 g. of 90.5 pure material.

Example 7

To a mixture of 0.00695 mole of 7-ACA (84.8 percent pure) in 30 ml. of acetone and 4.03 g. of biuret, there was added with stirring 0.01029 mole of thiophene-2-acetyl chloride diluted in 15 ml. of acetone over 1 hour at room temperature. The reaction mixture was purified to separate water soluble material and then the organic phase containing the cephalothin product was treated with sodium acetate diluted in methanol to obtain 2.1 g. of sodium cephalothin crystals which were 96.3 percent pure product.

I claim:

1. In a process for acylating 7-ACA with an acyl halide to obtain a cephalosporin acylation product, the improvement which comprises contacting the 7-ACA with the acyl halide in the presence of (1) a substantially anhydrous organic liquid diluent which is a nonsolvent for the 7-ACA, chemically inert toward the acyl halide, but which is a solvent for the cephalosporin acylation product, and (2) at least one member of the group consisting of urea, thiourea, biuret, dithiobiuret, phenylurea, 1,1-diphenylurea, and phenylthiourea, said component (2) being present in the reaction mixture in an amount ranging from about 0.5 to about 2.0 molar equivalents of said component (2) for each molar equivalent of the acyl halide.

2. A process as defined in claim 1 wherein the organic liquid diluent (1) is selected from the group consisting of dialkyl ketones having from 1 to 2 carbon atoms in each alkyl group, alkyl aliphatic acylates having from 2 to about 7 carbon atoms, dialkyl sulfoxides having from 1 to about 4 carbon atoms in each alkyl group, and the component (2) is urea.

3. A process as described in claim 2 wherein the organic liquid diluent (1) is a dialkyl ketone having from 1 to 2 carbon atoms in each alkyl group, and the component (2) is urea, which is present in an amount ranging from about 0.8 to about 1.2 molar equivalents of urea per molar equivalent of the acyl halide used.

4. A process as described in claim 3 wherein the organic liquid diluent (1) is a mixture of diluents including a major proportion of acetone, and the component (2) is urea, which is present in amounts ranging from about 0.8 to about 1.2 molar equivalents of urea per molar equivalent of the acyl halide used.

5. A process of making sodium 7-(2'-thienylacetamido)-cephalosporanic acid salt by the process according to claim 1 which comprises (1) forming a mixture of (a) 7-ACA in (b) a substantially anhydrous organic liquid diluent, and (c) at least one member of the group consisting of urea, thiourea, biuret, dithiobiuret, phenylurea, phenylthiourea, and 1,1-diphenylurea (2) contacting said mixture with 2-thienylacetyl chloride to form 7-(2'-thienylacetyl)-cephalosporanic acid, and (3) contacting said 7-(2'-thienylacetamido)cephalosporanic acid with a water soluble sodium organic acid salt in an organic liquid diluent to form the sodium 7-(2'-thienylacetamido)cephalosporanate salt.

6. A process as described in claim 5 wherein the substantially anhydrous organic liquid diluent (1) (b) contains a major proportion of acetone any additional organic liquid diluent being ethyl acetate, the mixture component 1 (c) is urea; in step (2) the 2-thienylacetyl chloride is added to the mixture at a steady rate in from about 0.5 to 1.5 hours at from about 15 to 35 C.; and in step (3) the water soluble sodium salt is sodium acetate in methanol to effect precipitation of sodium 7-(2'-thienylacetamido)cephalosporanic acid salt from the organic liquid.

References Cited

UNITED STATES PATENTS 3,297,692   1/1967   Flynn _____ 260—243

NICHOLAS S. RIZZO, *Primary Examiner.*